United States Patent
Rohling

(10) Patent No.: US 9,739,879 B2
(45) Date of Patent: Aug. 22, 2017

(54) METHOD AND DEVICE FOR DETERMINING DISTANCE AND RADIAL VELOCITY OF AN OBJECT BY MEANS OF RADAR SIGNAL

(71) Applicant: S.M.S. Smart Microwave Sensors GMBH, Braunschweig (DE)

(72) Inventor: Hermann Rohling, Wolfenbuettel (DE)

(73) Assignee: S.M.S. Smart Microwave Sensors GMBH, Braunscheweig (DE)

( * ) Notice: Subject to any disclaimer, the term of this patent is extended or adjusted under 35 U.S.C. 154(b) by 386 days.

(21) Appl. No.: 14/394,391

(22) PCT Filed: Mar. 16, 2013

(86) PCT No.: PCT/DE2013/000154
§ 371 (c)(1),
(2) Date: Oct. 14, 2014

(87) PCT Pub. No.: WO2013/156012
PCT Pub. Date: Oct. 24, 2013

(65) Prior Publication Data
US 2015/0084806 A1    Mar. 26, 2015

(30) Foreign Application Priority Data
Apr. 19, 2012   (DE) .................. 10 2012 008 350

(51) Int. Cl.
*G01S 13/42*      (2006.01)
*G01S 13/58*      (2006.01)
(Continued)

(52) U.S. Cl.
CPC .......... *G01S 13/582* (2013.01); *G01S 13/345* (2013.01); *G01S 2007/356* (2013.01)

(58) Field of Classification Search
CPC .... G01S 13/345; G01S 13/584; G01S 13/931; G01S 7/4008; G01S 13/582; G01S 2007/356
(Continued)

(56) References Cited

U.S. PATENT DOCUMENTS 5,268,692 A * 12/1993 Grosch ................ G01S 13/345
                                                        342/129
2010/0289692 A1* 11/2010 Winkler ............... G01S 7/4008
                                                        342/70

FOREIGN PATENT DOCUMENTS

DE        4244608 A1      7/1994
DE      102009000468 A1   8/2009
(Continued)

OTHER PUBLICATIONS

Vivet et al., "Line-Based SLAM with Slow Rotating Range Sensors: Results and Evaluations", ICARCV 2010 Conference, p. 423-430, Dec. 7, 2010.
(Continued)

*Primary Examiner* — Timothy A Brainard
(74) *Attorney, Agent, or Firm* — Whitham, Curtis & Cook

(57) ABSTRACT

The present invention relates to a method for determining distance (R) and radial velocity (v) of an object in relation to a measurement location, in which method radar signals are emitted and after reflection on the object are received again at the measurement location, wherein the emitted radar signals are subdivided within a measuring cycle into numerous segments (10) in which the frequency of the radar signals is gradually changed from an initial value ($f_A$, $f_B$) to the end value and each received reflected signal is subjected across one segment (10) to a first evaluation to detect frequency peaks and additionally a subsequent second evaluation of the signals for the frequency peaks of all
(Continued)

segments (10) of the measuring cycle is carried out to determine a Doppler frequency component as a measure of the radial velocity (v). According to said method, an ambiguity in the determination of the relative velocity (v) is eliminated by subdividing the segments (10) into at least two groups (A, B), the initial value ($f_A$, $f_B$) of which and/or end value of the changing frequency are different, by subjecting the segments (11, 12) of each group (A, B) separately to the second evaluation and by determining a phase difference of the signals occurring during the second evaluation of the segments (11, 12) of each group (A, B) and corresponding to each other, thereby removing ambiguities in the determined velocity.

10 Claims, 2 Drawing Sheets

(51) Int. Cl.
*G01S 13/34* (2006.01)
*G01S 7/35* (2006.01)

(58) Field of Classification Search
USPC .................. 342/109 R, 1, 174; 2/70; 42/129
See application file for complete search history.

(56) References Cited

FOREIGN PATENT DOCUMENTS

| | | |
|---|---|---|
| EP | 1918736 A2 | 5/2008 |
| EP | 2841961 B1 | 11/2016 |
| JP | 2000235072 A | 8/2000 |
| JP | 2003270336 A | 9/2003 |
| WO | 0231529 A2 | 4/2002 |
| WO | 03048802 A2 | 6/2003 |

OTHER PUBLICATIONS

Schroeder et al., "X-Band FMCW Radar System with Variable Chirp Duration", IEEE Radar Conference 2010, p. 1255-1259, May 10, 2010.
Monod et al., "Intertwined Linear Frequency Modulated Radar and Simulator for Outdoor Robotics Applications", IEEE International Conference on Radar Systems, Dec. 10, 2009.

\* cited by examiner

METHOD AND DEVICE FOR DETERMINING DISTANCE AND RADIAL VELOCITY OF AN OBJECT BY MEANS OF RADAR SIGNAL

The invention relates to a method for determining the distance and radial velocity of an object in relation to a measurement location, with which radar signals are transmitted from the measurement location and received again after reflection at the object, wherein the transmitted radar signals are subdivided within a measurement cycle into numerous segments, in which they are changed in their frequency from an initial value to a final value and the received reflected signals are each subjected over a segment to a first evaluation for detecting frequency peaks and additionally a subsequent second evaluation of the signals for the frequency peaks of all segments of the measurement cycle is carried out to determine a Doppler frequency component as a measure of the radial velocity.

The invention further relates to a device for determining the distance and radial velocity of an object in relation to a measurement location, with a radar transmitter, a receiver disposed at the measurement location for radar signals of the radar transmitter reflected from the object, wherein the radar signals are subdivided within a measurement cycle into numerous segments, in which they are changed in their frequency from an initial value to a final value, with a first evaluation device connected to the receiver for detecting frequency peaks within each of the segments of the received signals, and with a second evaluation device connected to the first evaluation device for the evaluation of a phase difference of the determined frequency peaks for determining a Doppler frequency component as a measure of the radial velocity.

It is known to determine both the distance and also the radial velocity of an object relative to a measurement location by means of suitably modulated radar signals with a measurement.

A suitable known type of modulation of the radar signals is described in EP 1 325 350 B1. With this two nested ramps A and B are modulated during a measurement cycle of e.g. 65 ms length ($T_{chirp}$). 512 sample values of the reflected signal are recorded per ramp and evaluated separately for each ramp. The evaluation is carried out by means of FFT (Fast Fourier Transformation) with a total of 2×512 sampling points. Accordingly, the sampling period is 65 ms/2×512=63.48 μs. The sampling frequency is thus 15.75 kHz, wherein the effective sampling frequency per ramp is half this value, i.e. 7.88 kHz. The Doppler frequency range of 7.88 kHz corresponds to a unique velocity measurement range of 49 m/s for a carrier frequency of 24.125 GHz. The unique velocity measurement range corresponds to 176.4 km/h, and is thus suitable for use in road traffic in general, because the measurement location, i.e. the radar transmitter and radar receiver, is normally disposed in the vehicle and radial velocities between traveling vehicles of >175 km/h—at least in urban traffic—do not occur in practice. Said method has disadvantages, however, if there are many reflectors, which are all represented as peaks in a frequency spectrum. Said spectrum can therefore be densely occupied. A plurality of reflectors can "mask" each other so that in unfavorable cases relevant objects cannot be (continuously) detected.

It is further known to modulate the transmission signal with short, rapid and identical ramps. During a cycle time of 65 ms, e.g. 256 ramps can be modulated, each having a length $T_{chirp}$ of 254 μs. If each ramp is sampled with 512 sampling values, this corresponds to an effective sampling period of 65 ms/256×512=496 ns, i.e. a sampling frequency of 2.01 MHz.

With said sampling frequency of 2.01 MHz, a first evaluation is carried out in the form of a first FFT. A second FFT is carried out from ramp to ramp, i.e. with an effective sampling period of 65 ms/256=254 μs, corresponding to a sampling frequency of 3.94 kHz.

With the sampling frequency of 2.01 MHz for the first FFT there is a frequency peak for the reflected signals per ramp that arises predominantly from the frequency component due to the distance. For normal velocities, such as occur in road traffic, The Doppler frequency component is negligibly small, so that a signal is already available for the distance for each ramp during the first FFT. Said corresponding signals of all (e.g. 256) ramps of a sampling period can be combined with each other, so that a very high signal-to-noise ratio results for the distance determination. This enables objects of the size of a man or of a large animal to be reliably detected at a distance of more than 7 km, e.g. in stationary monitoring radars. Whereas the first FFT (range FFT) is carried out per ramp, so that for 256 ramps there are also 256 frequency spectra of the first FFT, the second FFT (Doppler FFT) is preferably carried out for each distance value ("range gate"). It is, however, also possible to carry out the second FFT only for selected distance values. For example, such range gates can be selected for which a reflection has been detected. The result of the two FFTs can be represented in a range Doppler matrix (RDM), as shown in FIG. 1. In a situation with numerous reflectors, these are thus distributed in the range Doppler matrix (RDM) in two dimensions, so that the probability of mutual masking is considerably reduced. The sampling frequency of 3.94 kHz for the second FFT corresponds to a unique velocity measurement range of 24.5 m/s, corresponding to 88.2 km/h. Said uniqueness range is not adequate for many applications. In the exemplary embodiment illustrated in FIG. 1 of the signal modulation known in the prior art, the frequency shift per ramp is 100 MHz. It can be seen in FIG. 1 that the signal (receive signal) received after the reflection is time-shifted relative to the transmitted signal (transmit signal) by the transition time of the signal. Two L ramps are shown in FIG. 1 (e.g. 2 L=256). For each ramp there is a range FFT with identification of a range frequency ($f_{Beat}$) The signals found for the detected frequency $f_{Beat}$ are fed to the second Doppler FFT, from which the range Doppler matrix results.

The mathematical description of said method uses the fact that the measured frequency $f_{Beat}$ arises from a frequency component $f_R$ due to the target distance R and a component $f_D$ resulting from the Doppler effect:

$$f_{Beat} = f_R - f_D = -\frac{f_{SW}}{T_{chirp}} \frac{2}{c} \cdot R + f_0 \frac{2}{c} \cdot v_r \quad (1)$$

Here $f_{SW}$ refers to the bandwidth and $T_{chirp}$ to the time duration of a single frequency ramp; c is the speed of light, $f_0$ is the lower carrier frequency of the transmission signal and $v_r$ is the radial velocity.

The received signal is mixed with the transmission signal in the baseband. Said mixed received signal is given by $$s(t) = e^{\left(j2\pi\left(tf_{Beat} + f_0 \frac{2R}{c}\right)\right)} \quad (2)$$

If a coherent sequence of a total of 2L ramp signals (i.e. a measurement cycle, corresponding here to 2L=256 ramps) is considered, wherein l represents the running index of the ramps, the (two dimensional) time-continuous signal described in the above equation is specified as follows. The parameter $f_{D,md}$ describes the Doppler frequency, which can be measured quite ambiguously.

$$s(t, l) = e^{\left(j2\pi\left(tf_{Beat}-f_{D,md}T_{chirp}l+f_0\frac{2R}{c}\right)\right)} \quad (3)$$

The (two dimensional) time-continuous signal obtained with the sampling frequency $f_{sa}$ is then (k is the running index of the time discrete signal within a ramp, from zero to K−1; K corresponds to the number of sample values in a ramp, in this case equal to 512):

$$s(k, l) = e^{\left(j2\pi\left(f_{Beat}\frac{k}{f_{sa}}-f_{D,md}T_{chirp}l+f_0\frac{2R}{c}\right)\right)} \quad (4)$$

This signal is transformed with a FFT per ramp (range FFT over K sampling values of each ramp) and a new two dimensional signal results (m is the running index of the spectral line of the range FFT from zero to K−1):

$$s(m, l) = \sum_{k=0}^{K-1} e^{\left(j2\pi\left(f_{Beat}\frac{k}{f_{sa}}-f_{D,md}T_{chirp}l+f_0\frac{2R}{c}\right)\right)} \cdot e^{-j2\pi\frac{k \cdot m}{K}} \quad (5)$$

Each second FFT (Doppler FFT), which is calculated for each k with an FFT length of 2L and for each n spectral line of the Doppler FFT, provides the following spectrum:

$$s(m, n) = \sum_{l=0}^{2L-1}\sum_{k=0}^{K-1} e^{\left(j2\pi\left(f_{Beat}\frac{k}{f_{sa}}-f_{D,md}T_{chirp}l+f_0\frac{2R}{c}\right)\right)} \cdot e^{-j2\pi\frac{k \cdot m}{K}} e^{-j2\pi\frac{l \cdot n}{2L}} \quad (6)$$

Said signal S(m,n) is formed as a range Doppler matrix (RDM) and contains the above-mentioned ambiguities in the Doppler frequency measurement, for which there is at first no solution for said transmission signal. For the application of said method in practice, greater complexity must therefore normally be applied in order to eliminate the ambiguities in the Doppler frequency measurement. For this reason the method becoming known as a 2D FFT method (two-dimensional FFT method) has practical disadvantages.

The object of the present invention is on the one hand to exploit the principles of rapid ramp modulation of the transmission signal with the subsequent two-dimensional evaluation and to achieve their advantages, on the other hand to avoid the disadvantages of the ambiguity of the velocity measurement in a simple manner.

In order to achieve said object, according to the invention the method of the type mentioned above is characterized in that the segments are subdivided into at least two groups, whose initial value and/or final value of the varying frequency are different, that the segments of each group are separately subjected to the second evaluation and that elimination of the ambiguities of the determined velocities is carried out by determining a phase difference of the mutually corresponding signals that arise during the second evaluation of the segments of each group.

In a corresponding manner, the device of the type mentioned above according to the invention is characterized in that segments of at least two groups are used for the evaluation in the evaluation devices, having a different initial value and/or final value of the varying frequency, that the second evaluation device comprises at least two evaluation stages for the separate evaluation of the signals of the at least two groups and that at least one phase difference detector, whose output signals can be used for uniquely determining radial velocities, is connected to the at least two evaluation stages.

The method according to the invention thus uses the segments of a radar signal in the form of frequency ramps, wherein at least two, preferably exactly two, groups of segments are formed that are nested within each other, so that a ramp of one group adjoins the corresponding ramp of the other group. The ramps of the two or more groups differ from each other in respect of their initial values and/or final values of the varying frequencies, so that ramps are used that are offset in the frequency direction in the frequency-time representation in each case and that are otherwise preferably of the same form, i.e. having an identical frequency shift and an identical gradient. The frequency shifts should be very small here and e.g. less than $10^{-3}$, preferably about $10^{-4}$ or less, times the modulation shift of the frequency ramp. Surprisingly, with said form of the modulation of the transmission signals, simultaneous and unique indications of the distance measurement and the Doppler frequency measurement arise if the phase difference for the frequency peaks of the range Doppler matrix is determined, which is explained in more detail using an exemplary embodiment.

For the generation of the different frequency ramps of the two (or more) groups, the frequency ramps can be generated equally with a suitable generator for both groups and physically transmitted, wherein, however, for both groups somewhat shifted segments of the frequency ramps are used for the evaluation. For a real modulated frequency shift $f_{sw}$, the frequency shift used is then $f_{sw}-(f_B-f_A)$, wherein $f_A$ is the initial frequency value for the first group A of segments and $f_B$ is the initial frequency value for the second group B of segments.

In a similar manner, initial or final segments of the received signals of the two groups can be "truncated" by discarding corresponding sampling values at the start or at the end of the sampling, i.e. leaving the same unevaluated. Graphical representations of exemplary embodiments are used in order to explain the invention. In the figures.

Figure 1:
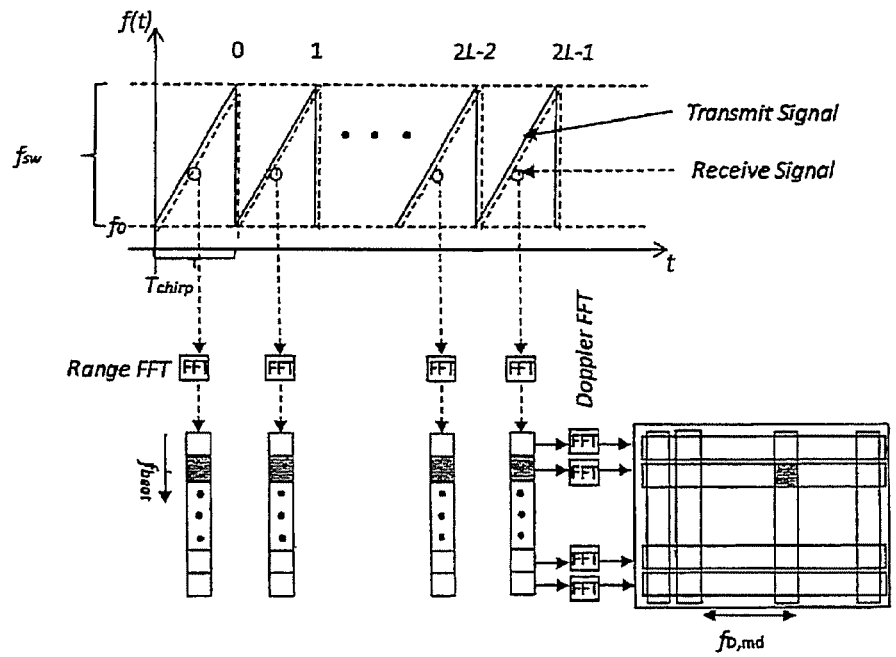
FIG. 1 shows a curve profile and schematic evaluation signals for forming a range Doppler matrix by two dimensional FFT according to the prior art.
Figure 2:
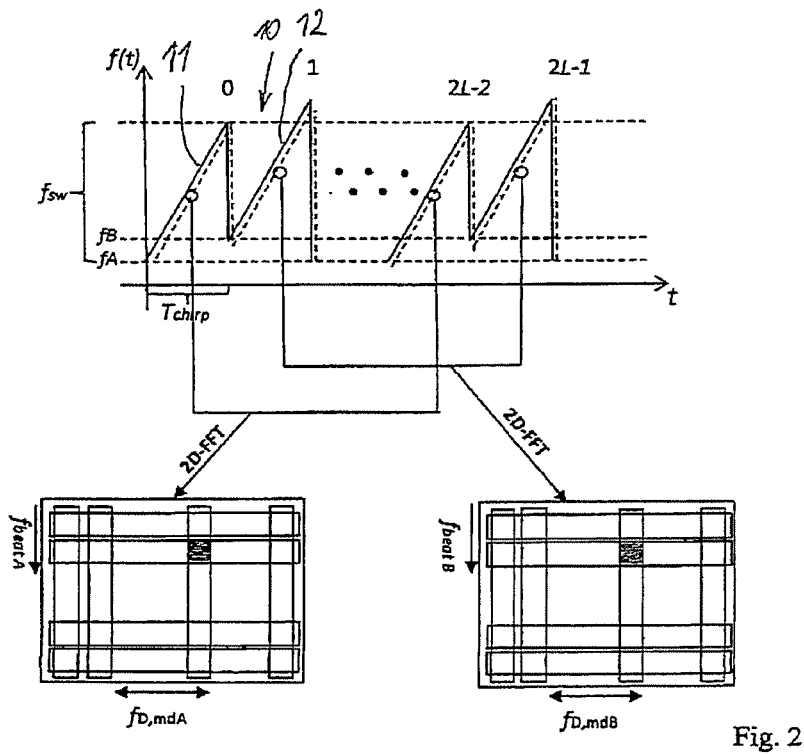
FIG. 2 shows a curve profile according to the invention in accordance with an exemplary embodiment of the invention with two evaluation range Doppler matrices.

FIG. 2 contains a graphical representation of the profile of a transmission signal, wherein the frequency of the transmission signal f(t) is plotted against time t. The transmission signal consists of 2 L segments 10, which form two groups A, B of frequency ramps. The segments 11 of the first group A extend from an initial value $f_A$ over a modulation shift $f_{SW}$, whereas the segments 12 of the second group B extend from an initial value $f_B$ with the same modulation shift (bandwidth) $f_{SW}$. The segments 11, 12 of groups A, B adjoin each other alternately, so that all even-numbered segments belong to group A and all odd-numbered segments belong to group B.

As in the prior art, a respective evaluation is carried out for each segment 10, preferably in the form of an FFT. Using a second evaluation, especially a second FFT, a range Doppler matrix is formed for the segments 11 of the first group on the one hand and for the segments 12 of the second group B on the other hand. there are thus different measured beat frequencies $f_{Beat}$ A and $f_{Beat}$ B for the two matrices.

The transmission signal according to the invention consists initially of a classic transmission signal, i.e. of short rapid ramps, with a fixed specified ramp duration $T_{chirp}$. However, the two groups of ramps A and B are transmitted in a nested "intertwined" mode. Only a very little changed lower carrier frequency is set between the first segments (ramps) 11 and the second segments (ramps) 12, differing e.g. by 10 kHz. Thus in the first group A in the exemplary embodiment the transmission signal is modulated from $f_0$ to $f_0+100,000$ MHz and in the other group of ramps B from $f_0+10$ kHz to $f_0+100,010$ MHz.

The echo signals are mixed with the current transmission frequency in the baseband. The range Doppler matrices are generated for the two groups of ramps A and B. A target or object is accordingly observed and detected in both groups of ramps A and B in exactly the same cell of the two range Doppler matrices (RDM).

Because the Doppler frequency analysis (second FFT) is carried out for each group of ramps A, i.e. over two ramp intervals in each case, the already small uniqueness range of the Doppler frequency in the prior art is halved again.

However, owing to the measures according to the invention, this does not result in disadvantages. With the transmission signal according to the invention and the two lower carrier frequencies $f_A=f_0$ and $f_B=f_0+10$ kHz, the two range Doppler matrices for the two nested signals exist with the following spectra following the two-dimensional FFT:

$$S_A(m,n) = \sum_{l=0}^{L-1}\sum_{k=0}^{K-1} e^{\left(j2\pi\left(f_{Beat}\frac{k}{f_{sa}} - f_{D,md}T_{chirp}2l + f_A\frac{2R}{c}\right)\right)} \cdot e^{-j2\pi\frac{k \cdot m}{K}} e^{-j2\pi\frac{l \cdot n}{L}} \quad (7)$$

$$S_B(m,n) = \sum_{l=0}^{L-1}\sum_{k=0}^{K-1} e^{\left(j2\pi\left(f_{Beat}\frac{k}{f_{sa}} - f_{D,md}T_{chirp}(2l+1) + f_B\frac{2R}{c}\right)\right)} \cdot e^{-j2\pi\frac{k \cdot m}{K}} e^{-j2\pi\frac{l \cdot n}{L}} \quad (8)$$

In total 2L ramp signals 11, 12 are transmitted during this. All even-numbered ramps (group A) are associated with the signal $S_A$, whereas the signal $S_B$ is composed of the odd-numbered ramps (group B) (2L+1). Compared to the known arrangement, the initial values $f_A$ and $f_B$ of the carrier frequencies in the two groups A, B are slightly shifted relative to each other. The segments (ramps) of a group A, B to be processed are separated from each other by a ramp length $T_{chirp}$ owing to the nested arrangement.

In this situation there are two range Doppler matrices, which are evaluated for specific cells. For detection purposes the signals are simply added incoherently by magnitude for each cell. For each detected target, the frequency $f_{Beat}$ and the ambiguous Doppler frequency $f_{D,md}$ can be read directly from the range Doppler matrix or calculated by an interpolation technique for increased accuracy. In this respect there are two range Doppler matrices with identical magnitude information (but different phase infatuation).

According to the invention, the phase difference per cell in the range Doppler matrix is now evaluated, advantageously only for those cells in which a target has been detected.

Mathematically, this is given by $$\Delta\Phi = \left[\left(\arg\left(\frac{S_A(m,n)}{S_B(m,n)}\right) - 2\pi \cdot f_{D,md}T_{chirp}\right) \bmod \pi\right] \quad (9)$$

$$= 2\pi\left((f_A - f_B)\frac{2R}{c}\right)$$

$f_{D,md} T_{chirp}$ is a phase correction factor that arises owing to the (possibly ambiguous) measured Doppler frequency $f_{D,md}$ from ramp to ramp. The phase rotates further from ramp to ramp by said value. This must be taken into account for the evaluation of the received nested signal arrangement. The target distance R and hence $f_R$ can now be calculated from the above equation and the phase difference measurement as follows:

$$R = \frac{\Delta\Phi}{2\pi} \cdot \frac{c}{2} \frac{1}{(f_A - f_B)} \quad (10)$$

$$f_R = -\frac{T_R}{T_{chirp}} \cdot f_{sw} = -\frac{2R}{c} \cdot \frac{f_{sw}}{T_{chirp}} = -\frac{\Delta\Phi}{2\pi} \cdot \frac{1}{(f_A - f_B)} \frac{f_{sw}}{T_{chirp}} \quad (11)$$

Finally, the unique Doppler frequency $f_D$ is given by the above equation taking into account the measured beat frequency $f_{Beat}$ and the measured phase difference:

$$f_D = f_R - f_{Beat} \quad (12)$$

$$= -\frac{\Delta\Phi}{2\pi} \cdot \frac{1}{(f_A - f_B)} \frac{f_{sw}}{f_{chirp}} - f_{Beat} \quad (13)$$

The evaluation of the measured phase difference results in a maximum unique measurable distance of $$R_{max} = \frac{1}{2} \cdot \frac{c}{2} \frac{1}{(f_A - f_B)} \quad (14)$$

For a frequency difference $(f_A-f_B)$ of 10 kHz, there is a maximum unique measurable distance of $R_{max}=7.5$ km. For a frequency difference $(f_A-f_B)$ of 4 kHz there is a maximum unique measurable distance of $R_{max}=18.75$ km.

Equation 11 thus results in not only an approximate but an accurate determination of the frequency relating to the distance R, which according to equations 12 and 13 enables accurate determination of the Doppler frequency $f_D$ in a unique manner.

The use according to the invention of two groups A, B of segments 11, 12 with nested frequency shifts thus enables unique and accurate determination of the distance and the radial velocity by means of the determination of the Doppler frequency. The described transmission signal can be generated in the required manner by a suitably controlled frequency generator. However, it is also possible that the real segments 10, 11 can be generated in the same way, but using a different virtual modulation. For this purpose, according to FIG. 3 the so-called "zero filling" is used. The real modulated frequency shift is thereby $f_{SW}$, but is not fully utilized. The frequency shift used in each case for the segments 11, 12 is $f_{SW}-(f_B-f_A)$.

Figure 3:
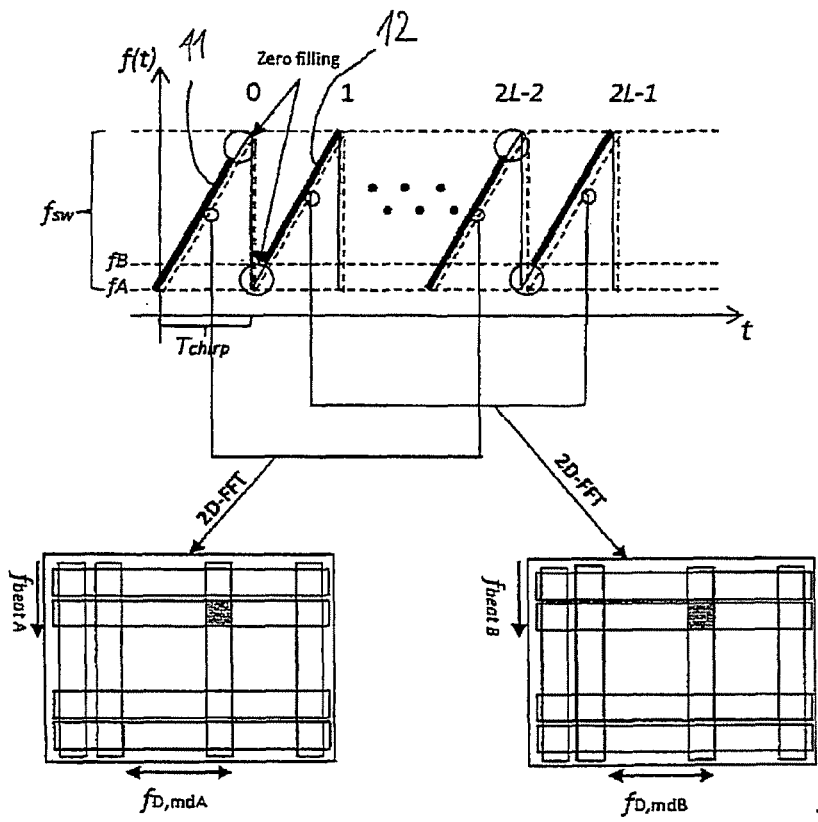
FIG. 3 shows a first version for forming the modulation of the transmission signals according to the invention.

FIG. 3 shows that for the segments 10 a real modulation is always used, which starts from the initial value $f_A$ and extends over the entire bandwidth $f_{SW}$. For the segments 11 of the first group A, the segment 11 starting with $f_A$ is used, whereas at the upper end a segment of width $f_B-f_A$ is not used.

For the segment 12 of group B, by contrast, the lower segment $f_B-f_A$ is not used, so that the same frequency shift $f_{SW}-(f_B-f_A)$ occurs for both segments 11, 12.

Figure 4:
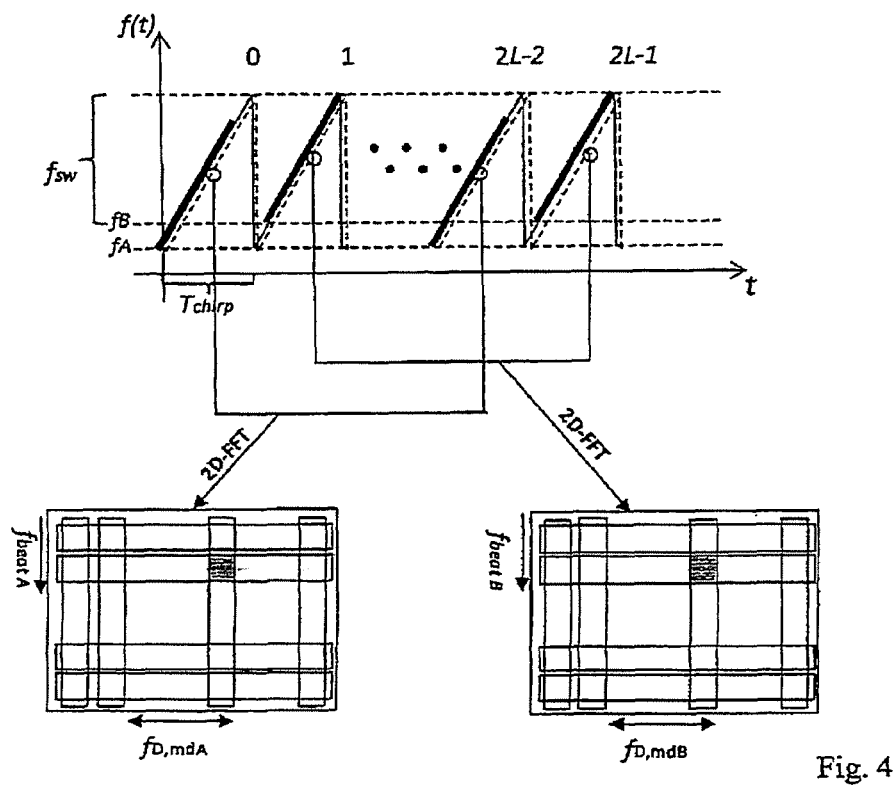
FIG. 4 shows a second version for forming the modulated signals according to the invention.

According to the version illustrated in FIG. 4, the segments 10 for both groups A, B are generated equally in real form. The length of the segments here is $f_{SW}+(f_B-f_A)$. The real modulated region is thus increased by $f_B-f_A$. Unused sampling values at the upper end of the segments 11 of the group A and at the lower end of the segment 12 of group B are discarded.

In all the described cases, the segments 10, 11 have the same frequency shift and the same gradient. This is not absolutely necessary. Different frequency shifts and different gradients can also be used in the method described here. However, the mathematical evaluation for this is somewhat complex.

The invention claimed is:

1. A method for determining the distance (R) and radial velocity (v) of an object in relation to a measurement location, with which radar signals are transmitted and following reflection at the object are received again at the measurement location, wherein the transmitted radar signals are subdivided within a measurement cycle into numerous segments, in which they are varied in their frequency from an initial value ($f_A$, $f_B$) to a final value, and the received reflected signals are subjected over a segment in each case to a first evaluation for detecting frequency peaks and additionally a subsequent second evaluation of the signals is carried out for the frequency peaks of all segments of the measurement cycle to determine a Doppler frequency component as a measure of the radial velocity (v), wherein the segments are subdivided into at least two groups (A, B) whose initial value ($f_A$, $f_B$) and/or final value of the varying frequency are different, where the segments of each group have the same form and the same initial values and final values, the segments of different groups are different with respect to initial values and final values, and the segments of each group (A, B) are separately subjected to the second evaluation and that elimination of ambiguities of the determined velocity is carried out by determining a phase difference of the mutually corresponding signals arising during the second evaluation of the segments of each group (A, B).

2. The method as claimed in claim 1, wherein the first evaluation is carried out as a first FFT using the sampling signals within a segment for determining the frequency peaks.

3. The method as claimed in claim 2, wherein the second evaluation is carried out as a second FFT using the mutually corresponding frequency peaks of the segments of the measurement cycle.

4. The method as claimed in claim 3, wherein determining the phase difference for the frequency peaks arising during the second FFT for the Doppler frequency takes place after at least two groups (A, B).

5. The method as claimed in any claim 1, wherein the segments of the two groups (A, B) are generated with the same real frequency profiles, but are used for a first group (A) from a first initial value ($f_A$) to a first final value and for the second group (B) from a second initial value ($f_B$) to a second final value for the measurement, wherein the initial values $f_A$, $f_B$ and final values are different from each other.

6. The method as claimed in claim 1, wherein the segments of the at least two groups (A, B) all have the same frequency shift.

7. The method as claimed in claim 1, wherein the frequency change of the segments in the groups (A, B) is constant and of the same size.

8. The method as claimed in claim 1, wherein the determined phase difference is also evaluated for accurate determination of the distance (R) of an object.

9. A device for determining the distance and radial velocity of an object in relation to a measurement location, with a radar transmitter, a receiver disposed at the measurement location for radar signals of the radar transmitter reflected from the object, wherein the radar signals are subdivided within a measurement cycle into numerous segments, in which they are varied in their frequency from an initial value ($f_A$, $f_B$) to a final value, with a first evaluation device connected to the receiver for detecting frequency peaks within each of the segments of the received signal, with a second evaluation device connected to the first evaluation device for evaluation of a phase difference of the determined frequency peaks for determining a Doppler frequency component as a measure of the radial velocity (v), wherein segments of at least two groups (A, B) are used for the evaluation in the evaluation devices, the initial value ($f_A$, $f_B$) and/or final value of the varying frequency of said segments being different, where the segments of each group have the same form and the same initial values and final values, the segments of different groups are different with respect to initial values and final values, and the second evaluation device comprises at least two evaluation stages for the separate evaluation of the signals of the at least two groups (A, B) and that at least one phase difference detector, whose output signals can be used for unique determination of radial velocities, is connected to the at least two evaluation stages.

10. The device as claimed in claim 9, wherein the output signal of the phase difference detector is also evaluated for determination of the distance (R).

* * * * *